Jan. 26, 1943. C. M. HELLER 2,309,454
MECHANISM CONTROL
Filed Aug. 28, 1941 2 Sheets-Sheet 2
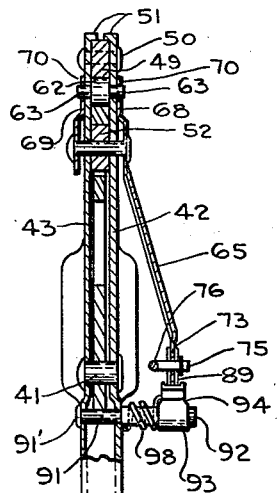
Fig-3
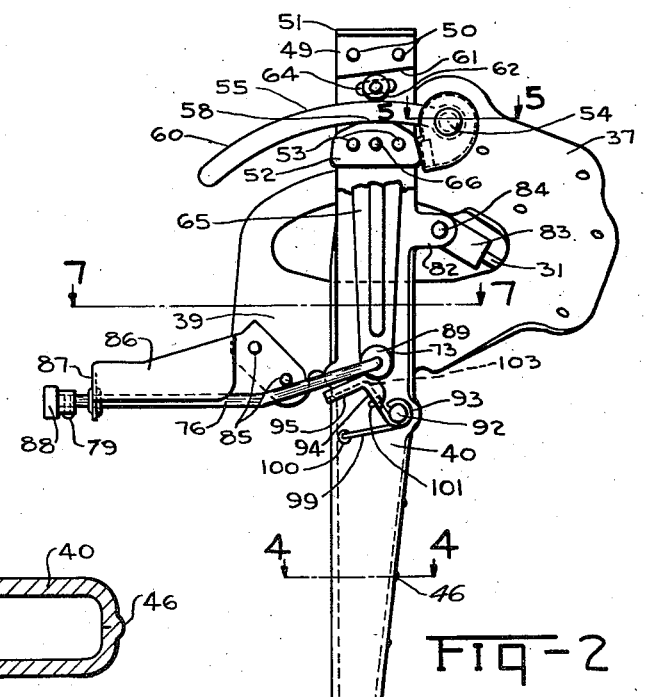
Fig-2
Fig-4
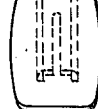
Fig-5
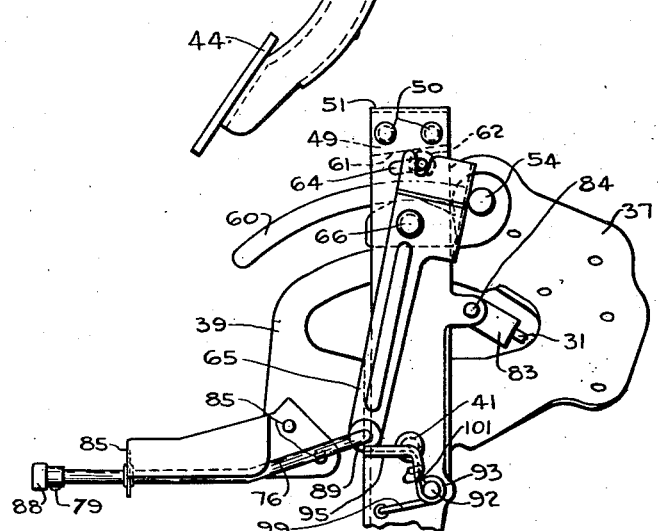
Fig-6
INVENTOR
Clifford M. Heller
BY
Braselton, Whitcomb & Davies Patented Jan. 26, 1943

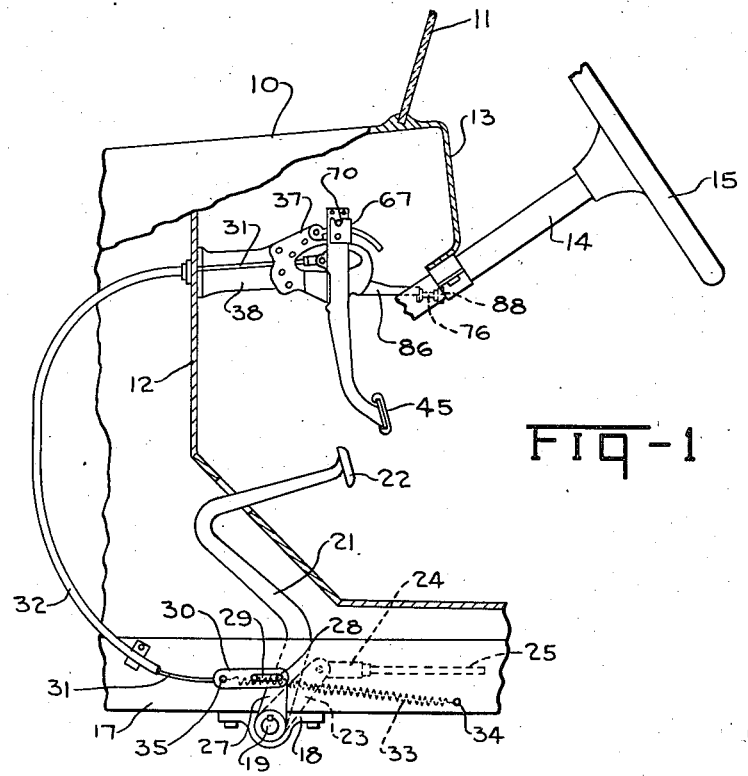

2,309,454

UNITED STATES PATENT OFFICE 2,309,454

MECHANISM CONTROL

Clifford M. Heller, Toledo, Ohio, assignor to The Bingham Stamping Company, Toledo, Ohio, a corporation of Ohio Application August 28, 1941, Serial No. 408,665

8 Claims. (Cl. 74—529)

This invention relates to a control mechanism or actuating apparatus, and more particularly to a mechanism and apparatus for actuating or controlling braking mechanism of an automotive vehicle.

The invention has for an object the provision of a foot operated lever arrangement embodying a clutching means of such nature that the lever arrangement may be retained in any position of adjustment and yet may be manually released with very little effort.

The invention is inclusive of a mechanism control including a lever and clutch arrangement of simple yet effective construction including foot operated lever mechanism and manually operated clutch releasing means, the latter being so arranged that the clutching means for retaining the lever mechanism in adjusted position may be rendered effective or ineffective at will.

A further object of the invention is the provision of a lever mechanism wherein the major parts are formed from sheet material thus effecting substantial reduction in cost and assembly and enhancing the uniformity and interchangeability of parts.

A further object of the invention resides in the provision of an emergency brake actuating pedal lever which depends from a point adjacent the instrument panel in which the lever retaining means comprises a locking device which may be released with the pedal lever in any position, and a manual control means for the locking device arranged to render said locking device effective or ineffective.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary elevational view, partly in section, showing a portion of the operator's compartment of the vehicle with the control mechanism of my invention embodied therein;

Figure 2 is a side elevational view of the control mechanism of my invention;

Figure 3 is a front elevational view of the arrangement shown in Figure 2 with certain parts illustrated in section;

Figure 4 is a sectional view taken substantially on the line 4—4 of Figure 2;

Figure 5 is a fragmentary sectional view taken substantially on the line 5—5 of Figure 2;

Figure 6 is a fragmentary view illustrating the locking device held in ineffective position by the manual control means.

Figure 7 is a horizontal sectional view taken substantially on the line 7—7 of Figure 2.

While I have shown the arrangement of the control mechanism of my invention as utilized for actuating the emergency brakes of an automotive vehicle, it is to be understood that I contemplate the use of my invention with any apparatus wherein the same may be found to have utility.

Referring to the drawings in detail, and first with respect to Figure 1 there is illustrated a portion of an operator's or driver's compartment of the vehicle wherein numeral 10 designates the cowl portion, 11 a windshield, 12 the dashboard, 13 the conventional instrument panel, 14 a steering post and 15 a steering wheel. A portion of the vehicle chassis frame is illustrated as at 17, the same carrying a bracket 18 upon which is journalled a transversely extending shaft 19. Secured to the shaft 19 is a service brake pedal or member 21 having a foot pad actuating portion 22. Also secured to the shaft 19 is an arm 23 which is connected by means of a clevis 24 and a rod 25 to the brake mechanism of the vehicle (not shown). Secured to shaft 19 is a second arm 27, having a pin 28 at its extremity which is received in a slot 29 of a member 30, the latter being secured at one end to the end of a flexible cable 31 which is positioned within a suitable sheath or guide 32. A spring 33 has one end thereof secured as at 34 to the frame, the other end being connected as at 35 to member 30.

The arrangement is inclusive of a support or member 37 carried by a member 38, the latter being supported by the dashboard 12 or other suitable portion of the vehicle. The support 37 is preferably formed with a vertically positioned uniplanar portion 39 which pivotally supports a depending lever member 40 by a pin or rivet 41 passing through member 39 and through the side walls 42 and 43 of the lever member as particularly shown in Figure 3. The lever member is inclusive of a body portion terminating in a foot pad 44 which may be covered by means of a rubber pad 45 as shown in Figure 1. The lever member is preferably made of a single sheet of metal formed to the configuration illustrated in Figures 2, 3 and 4 with the adjacent edges of the formed lever member welded together as at 46 in order to enhance the strength of the lever member. The upper extremity of the lever member is formed with spaced parallel side walls 42 and 43 straddling the uniplanar portion 39 of the support 37. Positioned between the upper extremities of the side walls 42 and 43 is a block or abutment 49 secured thereto by means of rivets 50, the upper ends of the side walls being flanged inwardly as at 51 to embrace the upper edge of block 49. Spaced from block 49 and also secured between the side walls of the lever member is a second block or abutment 52 held in place by means of rivets 53. Pivotally secured to support 37 by means of a rivet or pin 54, as shown in Figures 2 and 5, is an arcuately shaped bar 55 which projects between the side walls 42 and 43 of the lever member. The upper edge surface 58 of block 52 is shaped to provide a clutching surface with the bar 55 as particularly illustrated in Figure 2.

Positioned between the upper arcuate clutch surface 60 of bar 55 and the lower clutch surface 61 of the block 49 is a clutch means or roller 62 having tenon portions 63 which extend through elongated slots 64 in the side walls 42 and 43 of the lever member. A manipulating lever or arm 65 is pivotally supported upon a pin or rivet 66 passing through block 52 and the side walls of the lever member, the arm 65 being formed of sheet metal and having a U-shaped portion 67, the side walls 68 and 69 of which straddle the exterior walls of the lever member 41 adjacent the clutch roller 62. The side walls 68 and 69 are formed with open ended slots 70 which receive the extremities of tenons 63 of the clutch roller 62.

With particular reference to Figure 2, it is to be noted that the lower edge 61 of the block 49 and the arcuate upper edge of bar 60 converge to form a wedging angle for cooperation with the clutch means or roller 62 for the purpose of maintaining the lever member 40 in "brake setting" position. The extremity 73 of the arm or lever 65 is provided with an opening which receives a laterally extending end portion 75 of a rod 76. Secured by means of rivets 85 to the support 37 is a sheet metal bracket 86 which has an extended portion 87 terminating adjacent the instrument panel 13 and is formed with an opening through which projects rod 76. Mounted upon the projecting portion of the rod 76 is a handle or manipulating means 88 secured to the rod by means of a screw 79 or other suitable means.

Also mounted upon the laterally extending portion 75 of rod 76 and arranged on each side of arm 65 are circular washers or discs 89. The portion 75 of rod 76 and the discs 89 are held in position with respect to the arm 65 by means of a cotter key 90 passing through an opening in portion 75.

The side walls of the body portion of lever 40 are bored to receive a tenon 91 formed upon the extremity of a member 92, the extremity of the tenon 91 being swaged over as indicated at 91' to hold member 92 fixedly to the lever body. Journalled upon member 92 is a sheet metal element or bracket 93 which has an upwardly projecting portion 94 and a portion 95 arranged substantially at an angle with respect to portion 94, the juncture of portions 94 and 95 forming an apex 103. The portions 94 and 95 are of channel shaped cross-section as indicated in Figure 2, the side walls 96 and 97 embracing the discs or rollers 89. The member 92 is surrounded by means of a spiral spring 98, one end 99 of which extends into an opening 100 in the lever body, the other extremity of the spring being formed into a hook-like configuration 101 which engages portion 94 of the bracket 93. The tension of spring 98 is such as at all times to urge the bracket 93 into constant engagement with the discs 89 journalled on portion 75 of the rod 76. When the arm 65 and bracket 93 are in the position shown in Figure 2, the spring 98 tends to rotate bracket 93 in a counter-clockwise direction, as viewed in Figure 2, and the bracket being in engagement with the discs 89, serves to move lever 65 in a counter-clockwise direction about its pivot pin 66 to urge the clutch roller 62 toward wedging engagement with the arcuate surfaces 61 and 60 of the block 49 and bar 55 respectively. The lever member 40 is provided with a projection 82 which is adapted to be straddled by a clevis 83 connected to member 82 by means of a pin 84, the clevis being secured to the upper extremity of the flexible brake actuating cable 31. It should be noted that the axis or fulcrum 41 of the lever member 40 is normally in alignment with the point of connection of the rod 76 with the clutch releasing lever 65 so that irrespective of the relative position of lever member 40, there is no relative change in the position of the point of connection of rod 76 with lever or arm 65, so that the latter may be actuated at all times irrespective of the position of the brake actuating lever or pedal 40.

The operation of the device of my invention is as follows: As illustrated in Figure 1, the pedal lever 40 is in normal or brake released position. When it is desired to effect setting of the emergency brakes, the vehicle operator causes the lever 40 to oscillate in a clockwise direction about the fulcrum or pin 41 by pressure upon the foot pad 45. As the pedal lever 40 is moved toward brake setting position, the clutch roller 62 does not restrain movement of lever 40, but when the pedal lever 40 is brought to brake setting position, the roller 62, under the influence of spring 98 acting through bracket 93 and lever 65, is urged into wedging engagement between the surface 61 of the block 49 and surface 60 of the bar 55 and serves to hold the lever member 40 in brake setting position. The arrangement of pivotally supporting the bar 55 upon the support 37 compensates for inaccuracies in the manufacture of the surfaces 58 and 61 and also compensates for any wear of the clutch roller or clutch surfaces. To effect a release of the emergency brakes, the operator grasps the manipulating button 88 and by outward movement thereof away from the instrument panel 13 actuates rod 76 and actuates the releasing lever 65 in a counter-clockwise direction about its fulcrum pin 66 and moving the rollers 89 over the apex 103 into contact with portion 95 of bracket 93. As shown in Figure 5, the angle of portion 95 when in engagement with rollers 89, and under the influence of the spring 98 urging bracket 93 in a counter-clockwise direction causes arm 65 to be urged in a counter-clockwise direction about pivot pin 66 to retain the clutch roller out of engagement with clutch surfaces 60 and 61. The tension of spring 33 acting upon the cable 31 serves to retract the pedal lever 40 to brake released position. In order to minimize the shock resulting when spring 33 returns the lever 40 to brake released position, there is provided a sheet metal bracket 105 having a portion thereof covered with moulded rubber 106 or the like which acts as a buffer when engaged by the block 52 secured to the lever member 40. It is to be noted that the pedal lever 40 may be released irrespective of its position as the rod 76 connects with the releasing lever 65 at the axis of the fulcrum 41 of the pedal lever so that during relative movements of the pedal lever the extremity of the releasing lever remains in relatively fixed position with respect to the fulcrum of the pedal lever. The manipulating means 88 and rod 76 when moved to a position wherein the discs 89 engage portion 95 of bracket 93, the clutch roller 62 by means of tenons 63 being carried in slots in the side walls 68 and 69 of arm 65 is rendered ineffective to hold the pedal lever 40 in brake setting position. Thus, with the clutch release mechanism in the position shown in Figure 5, the pedal lever 40 may be moved under foot pressure to brake setting position and when the operator's foot is removed from the pad 45, the brakes will immediately be released under the influence of spring 33 serving to retract the brake cable and oscillate the lever 40 to "brake release" position. The manipulating means of my invention therefore is adaptable if desired to render the clutch means entirely ineffective so that the braking mechanism connected to the pedal lever 40 may be used as a service brake mechanism.

With the manipulating means 88 and rod 76 and arm 65, and associated mechanism in the position shown in Figure 2, the clutch roller 62 will at all times be urged toward wedging or clutching position so that whenever pressure is applied to the pad 45 to effect the setting of the brakes through movement of the lever 40, the clutch mechanism will hold the lever 40 and brake mechanism in set position. Release of the clutch may be instantaneously effected by outward movement of manipulating means 88 and rod 76 in turn actuating arm 65 and clutch roller 62.

It is apparent that, within the scope of the invention, modifications and different arrangements may be made other than is herein disclosed, and the present disclosure is illustrative merely, the invention comprehending all variations thereof.

What I claim is:

1. A mechanism control; a support; a foot operated lever fulcrummed upon said support and having a foot pad portion at a depending extremity of said lever; clutch means for holding said lever in adjusted position; clutch releasing means including a member pivotally supported on said lever; manipulating means connected to said clutch releasing member substantially in alignment with the fulcrum of said lever whereby said clutch releasing means may be actuated irrespective of the position of said lever; and means for locking said releasing member in clutch releasing position.

2. A mechanism control comprising a support; a lever of the first order of levers fulcrummed upon said support and having a foot pad portion arranged beneath said fulcrum; clutch means located above said fulcrum for holding said lever in adjusted position; releasing means including an arm pivotally carried by the lever associated with said clutch means; means manually operable from a remote position connected to said arm adapted to be actuated to releasing position irrespective of the position of said lever; and means for locking said clutch means through said releasing means in ineffective position.

3. In a mechanism control; a support; an arcuately shaped bar articulated with said support; a lever member formed of sheet metal to substantially U-shaped configuration and fulcrummed intermediate its ends upon said support; a foot pad portion secured to the depending extremity of said lever member, said lever member having at its upper end projecting side wall portions straddling said bar; a clutch roller cooperatively associated with said lever and arranged for contact with said arcuately shaped bar for holding the lever in adjusted position; a pair of abutments carried by said lever and arranged to be engaged by said clutch roller and said bar respectively; and means having connection with said clutch roller for locking the clutch roller in clutch releasing position.

4. In a mechanism control; a support; an arcuately shaped bar articulated with said support; a lever member formed of sheet metal to substantially U-shaped configuration and fulcrummed upon said support; a foot pad portion secured to the depending extremity of said lever member, said lever member having at its upper end projecting side wall portions straddling said bar; a clutch roller cooperatively associated with said lever and arranged for contact with said arcuately shaped bar; abutments carried by said lever and arranged to be engaged by said clutch roller and said bar; means having connection with said clutch roller for effecting a release of said clutch roller, said releasing means including an arm pivotally supported upon said lever member; and means including a bracket pivotally carried by said lever and cooperating with said arm for holding said clutch roller out of contact with said arcuately shaped bar.

5. In a mechanism control, a support; a lever fulcrummed upon said support and depending therefrom; a clutch roller for holding said lever in adjusted position; an arm pivotally supported on said lever and arranged to control said clutch roller; manually operated means connected to said arm for rendering said clutch roller effective or ineffective; a bracket pivotally supported on said lever; and spring means engageable with said bracket for biasing the latter into contact with said arm for resiliently urging said clutch roller toward effective or ineffective position depending upon the relative position of said manually operated means.

6. In a mechanism control; a support; an arcuately shaped bar articulated with said support; a lever member formed of sheet metal fulcrummed upon said support having at its upper end projecting side wall portions straddling said bar and carrying at its other end a foot pad; a clutch roller cooperatively associated with said lever and arranged for contact with said arcuately shaped bar; a pair of abutments carried by said lever arranged to be engaged by said clutch element and said bar respectively; means having connection with said clutch element for rendering the same ineffective, said means including an arm pivotally supported upon said lever; means adapted to engage said arm for rendering said clutch roller ineffective; and a manipulating rod connected to said arm.

7. In a mechanism control, a support; a lever fulcrummed intermediate its ends upon said support and depending therefrom; a bar pivotally connected to said support; a clutch roller arranged to engage said bar for holding said lever in adjusted position; an arm pivotally supported on said lever and arranged to control said clutch roller; manually operated means connected to said arm for rendering said clutch roller effective or ineffective; a bracket pivotally supported on said lever; and spring means engageable with said bracket for biasing the latter into contact with said arm for resiliently urging said clutch roller toward effective or ineffective position.

8. A mechanism control; a support; a foot operated lever fulcrummed upon said support and having a foot pad portion at a depending extremity thereof; clutch means for holding said lever in adjusted position; clutch releasing means including an arm pivotally supported on said lever; means manually operable from a remote position connected to said arm substantially in alignment with the fulcrum of said lever whereby said clutch releasing means may be actuated irrespective of the position of said lever; and means acting on said pivoted arm for holding the same in a position to render the clutch means ineffective.

CLIFFORD M. HELLER.